US005730526A

United States Patent [19]
Davis et al.

[11] Patent Number: 5,730,526
[45] Date of Patent: Mar. 24, 1998

[54] METHOD AND APPARATUS FOR MACHINE DIAGNOSIS

[75] Inventors: Stephen J. Davis; Barbara L. Jones; Robert D. Peck, all of King's Lynn, United Kingdom

[73] Assignee: Sun Electric U.K. Limited, King's Lynn, England

[21] Appl. No.: 602,513

[22] Filed: Feb. 20, 1996

[30] Foreign Application Priority Data

Feb. 21, 1995 [GB] United Kingdom .................. 9503274

[51] Int. Cl.$^6$ ........................................ G01N 25/00
[52] U.S. Cl. ......................................... 374/45; 374/4
[58] Field of Search .......................... 374/4, 5, 50, 57, 374/110, 121, 124, 126, 137; 188/1.11; 73/129; 340/438, 449, 453, 454; 364/426.1

[56] References Cited

U.S. PATENT DOCUMENTS

| | | |
|---|---|---|
| 3,350,702 | 10/1967 | Herman . |
| 3,461,284 | 8/1969 | Joy . |
| 3,686,954 | 8/1972 | Motl . |
| 4,069,712 | 1/1978 | Armstrong et al. . |
| 4,310,003 | 1/1982 | Schlager . |
| 4,486,103 | 12/1984 | Ando ................................ 374/4 |
| 4,584,523 | 4/1986 | Elabd . |
| 4,658,936 | 4/1987 | Moseley . |
| 4,674,326 | 6/1987 | Reinecke . |
| 4,717,811 | 1/1988 | Fujii . |
| 4,768,158 | 8/1988 | Osanai ............................... 374/5 |
| 4,820,057 | 4/1989 | Berndt . |
| 4,824,260 | 4/1989 | Novotny et al. . |
| 4,854,162 | 8/1989 | Yerace et al. . |
| 4,869,596 | 9/1989 | Klein et al. . |
| 5,032,727 | 7/1991 | Cox, Jr. et al. ..................... 374/5 |
| 5,069,005 | 12/1991 | Hovland et al. ................... 374/137 |
| 5,094,544 | 3/1992 | Ignatowicz ......................... 374/124 |
| 5,101,106 | 3/1992 | Cox, Jr. et al. . |
| 5,133,605 | 7/1992 | Nakamura . |
| 5,246,291 | 9/1993 | Lebeau et al. . |
| 5,292,195 | 3/1994 | Crisman, Jr. . |
| 5,302,940 | 4/1994 | Chen . |
| 5,331,311 | 7/1994 | Doctor . |
| 5,372,221 | 12/1994 | Jalbert . |
| 5,381,669 | 1/1995 | Bahel et al. . |
| 5,385,202 | 1/1995 | Drosdziok et al. . |
| 5,419,415 | 5/1995 | Lamb et al. . |
| 5,440,890 | 8/1995 | Bahel et al. . |
| 5,463,222 | 10/1995 | Lesko et al. . |
| 5,478,151 | 12/1995 | Duhrkoop .......................... 374/124 |

FOREIGN PATENT DOCUMENTS

| | | |
|---|---|---|
| 0189082 | 1/1986 | European Pat. Off. . |
| 0303827 | 7/1988 | European Pat. Off. . |
| 4319996 | 12/1994 | Germany . |
| 2200041 | 9/1987 | Japan . |
| 3203935 | 8/1988 | Japan . |
| 1036564 | 2/1989 | Japan . |
| 9300578 | 6/1992 | WIPO . |

*Primary Examiner*—G. Bradley Bennett
*Attorney, Agent, or Firm*—Emrich & Dithmar

[57] ABSTRACT

A method and apparatus for analysis of brakes in automotive vehicles, and related aspects of engine performance and like applications, senses heat energy which is generated internally of an article to be analysed. Spot-type infra-red thermometers are employed to sense localised temperature elevation produced by brake application from a remote location using visual positioning guides to enable the spot zones sensed to be accurately located on, for example, wheel nuts/studs, which provide a thermal transfer route from the brake drums or discs. Analysis of the thermal data from the sensors includes a peak detect-and-hold function to avoid the need for maintenance of accurate alignment of the sensors. Comparison of the thermal data enables detection of braking imbalance.

18 Claims, 8 Drawing Sheets

METHOD AND APPARATUS FOR MACHINE DIAGNOSIS

BACKGROUND OF THE INVENTION

1. Field of the Invention

This invention relates to a method and apparatus for brake testing and for machine diagnosis. An example of the application of the invention is to vehicle diagnosis, notably automotive applications, particularly braking and engine systems of same, but including also radiator systems, vehicle compartment sealing systems, air conditioning systems, tire operation monitoring and the monitoring of catalytic systems for the treatment of engine emissions. However, the invention is also expected to have application outside the automotive field.

So far as the machines to which the invention is applicable are concerned, these are principally machines in which thermal gradients are generated by the operation of the machine itself. While principal applications of the invention relate to machines in which heat is generated, it is not unlikely that the invention will find application in the field of refrigeration.

2. Description of the Prior Art

A particular but not exclusive application of the invention is to the diagnosis of faults in vehicle engine and braking systems. Conventional diagnosis techniques applied in these areas include electrodynamic analytical systems relating to engine operation, and often based upon signals obtained from the engine ignition system. So far as diagnosis of braking systems is concerned, conventional techniques have employed a dynamic approach to assessment by the use of such systems as rollers and rolling roads.

Shortcomings of such conventional diagnosis techniques include the fact that these conventional techniques do not in themselves apply directly to the specific area of the machine performance which may be the subject of interest (in the case of air conditioning system monitoring), or may be too general, (in the above-mentioned air conditioning example) and are time-consuming and costly to perform (in the case of brake testing). Other shortcomings include a requirement for a more direct measure of actual machine performance as a diagnostic tool.

There is disclosed in U.S. Pat. No. 3,461,284 (JOY) a heat detecting system for use in detecting excessively heated journals of moving trains and employing an infrared sensitive element continuously exposed to the heat of the passing journals of moving trains.

There is disclosed in U.S. Pat. No. 5,133,605 (NAKAMURA) a monitoring system employing infrared imaging, e.g, for monitoring outdoor transformer stations to detect abnormally high temperatures.

There is disclosed in U.S. Pat. No. 5,331,311 (DOCTOR) a railroad wheel temperature sensor with an infrared array which monitors the temperatures of zones on the wheels of railroad trains, generating a signal having temperature-indicative peaks which are analysed by a central processing unit to identify excessive temperatures and generate a hot wheel alarm.

There is disclosed in U.S. Pat. No. 5,419,415 (LAMB) apparatus for monitoring elevator brakes comprising temperature sensors inserted into the brake shoes.

To the best of the applicants' knowledge there has never been previously proposed a system for the monitoring of proper balancing of a vehicle braking system by the monitoring of the temperatures of brake system components after a braking operation, nor for the diagnosis of faults in machines such as internal combustion engine cylinder blocks by the thermal mapping of same in order to produce a temperature profile permitting identification of areas of thermal imbalance arising from operating conditions and indicative of the existence of a fault condition.

The apparatus disclosed in the above-mentioned U.S. '311 (Doctor) patent relates, more specifically, to the use of a plurality of infra-red temperature detectors with imaging means for projecting the image of a moving rail road wheel onto the detector array. The signals generated by the detector array define a temperature profile for the wheel. Such an arrangement may be effective for the specific task confronted by the system of this prior U.S. patent, namely distinguishing between the widely differing temperature profiles of wheel bearings and wheel flanges. By the use of a sophisticated sensor assembly employing, as shown in FIG. 2 of the patent, a lens and an infrared filter and multiple sensors, there is produced a two-dimensional profile of the relevant wheel portion in which it is possible to distinguish between the temperatures of the bearings and flanges using, effectively, an infra-red imaging system.

Such an arrangement is not only prohibitively expensive for use in relation to roadside automotive testing, but in any case the problem of overheating wheel flanges and bearings does not arise in automotive vehicle testing and there is no relevant disclosure in the U.S. specification concerning brake testing.

SUMMARY OF THE INVENTION

An object of the present invention is to provide a new and improved method and apparatus for brake testing and/or other machine diagnosis, and/or such a method and apparatus offering improvements in relation to one or more of the matters discussed above, or improvements generally.

According to the invention there is provided a method and apparatus for analysis of vehicle brake performance and machine performance as defined in the accompanying claims.

In this specification, and in the claims thereof, references to carrying out tests in relation to a vehicle's wheels or axles are to be interpreted as follows. In relation to testing for brake imbalance as between the front wheel brakes, or rear wheel brakes of a vehicle, it will be understood that for the purpose of checking for front or rear or other wheel brake balance, the relevant test will be between the wheels on opposite sides of the vehicle, these being usually considered as being on a common axle, though (except in the case of rear wheel drive axles and heavy goods vehicle axles) such wheels are usually mounted on individual stub axles rather than a common axle assembly. It will be understood that brake imbalance tests will be carried out accordingly either by comparing wheel/axle assemblies on opposite sides of the vehicle for lateral imbalance, or on the same side of the vehicle for front/rear balance, and the use of the terms axle and wheel are to be interpreted accordingly. The fact that goods vehicles use double wheel assemblies comprising two or more axially aligned wheels mounted on common stub axles makes no difference to the test routines of the present invention, and the use of the terms "wheel" and "axle" with reference to the definition of the invention are to be interpreted accordingly.

In an embodiment, a method and apparatus for analysis of brake performance in multi-axle vehicles comprises sensing means to determine dynamic performance and analysing data from the sensing means. In the embodiment the sensing means comprises infra-red sensor means adapted to sense remotely the temperature of a defined spot or zone on a brake disc or drum or structure connected thereto. The sensing means is caused to sense the temperature after a brake in question has effected a braking operation on a first vehicle wheel or axle, and then this step is repeated in relation to a brake of a second vehicle wheel or axle and the data obtained from the temperature sensing steps is compared to determine the degree of braking imbalance between the brakes of the first and second wheels or axles. Such comparison may be made between wheels or axles on the same or opposite sides of the vehicle.

In a corresponding method and apparatus applicable to engine tuning and location of radiator blockages, location of leakage of seals between passenger compartments and atmosphere, monitoring the operation of air conditioning systems, detection of differential tire pressures and monitoring the operation of catalytical systems for treating engine emissions, the thermal emissions of the relevant machine portions are monitored and compared to determine a thermal profile for the relevant machine portion. In the case of engine tuning, coolant and oil temperatures can be readily determined as a basis for analysis of temperature-dependent faults.

By providing temperature sensing means at the at least two defined locations and comparing the data from these there is provided a basis for thermal analysis of the braking system or other vehicle system, whereby faults may be identified or even a determination of the absence of faults may be established. For example, in the case of an engine, thermal analysis in accordance with these principles enables a thermal mapping operation to be carried out whereby inconsistencies therein may be used to identify engine faults, either on the basis of a comparison with adjacent areas of the engine, or on the basis of a comparison with known data relating to the engine.

In the described embodiments, the temperature sensing steps are carried out utilising a positional guide means to enable the remote infra-red sensor means to be properly aligned with the defined spot or zone on the relevant wheel or axle assembly. In the embodiment the positional guide means comprises a laser pointer or an optical (incandescent or vapour-discharge) pointer. Moreover, the data analysis apparatus includes a peak temperature detect-and-hold function which is operative to remove the need for prolonged accurate alignment of the temperature sensor with the relevant location on the wheel, such as a wheel nut. It is only necessary for the sensor to briefly be aligned with the relevant location and it picks and holds the value of the maximum temperature available in the zone, and uses this for analysis purposes.

In this way, the present invention is able to use relatively inexpensive and off-the-shelf infra-red sensor apparatus and such apparatus can be used in a simple and undemanding manner, for example merely by locating a laser pointer on a relevant wheel nut, the temperature of the nut is sensed and this is sufficient for test purposes. In this way, the relatively inexpensive spot-type infra-red apparatus utilised by the present invention is able to offer a degree of convenience of use and precision in data gathering which is out of all proportion to the low cost of the infra-red apparatus as compared with the sophisticated imaging equipment of the above-discussed U.S. patent to Doctor.

A particular advantage of the system of the invention resides in its relatively simple and easily-operated and portable form whereby the mere use of relatively well-known equipment such as infra-red temperature sensors, suitably coordinated in relation to the extraction of thermal data from the relevant portions of the machine in question, enables the diagnosis of comparatively sophisticated faults in a system, which might well not be easily identifiable by other means. Moreover this can be done on a roadside test basis.

In preferred embodiments of the invention, the temperature sensing means comprises spot or zone-type infra-red sensors, or other remote sensing means adapted to sense emitted radiation from a body being thermally monitored, as a basis for temperature determination. In other embodiments, thermocouples and other known temperature measurement devices may be employed. The infra red sensors are arranged to sense temperature over relatively small areas and the values thus obtained may be averaged as a basis for reducing the effect of local hot spots produced by the geometry of the relevant part of the machine concerned.

The technique of thermographic imaging is known as a means for non-destructive testing of materials in a quality control sense. In accordance with this technique the surface temperature distribution in the article being tested is monitored and examined for anomalies that indicate the presence of defects. For this purpose, the surface of the article to be tested is subjected to rapid temperature change by the application of heat from an external source. Temperature change is monitored and the pattern of heat dissipation is used as a basis for identifying and locating faults.

In accordance with the principles of the present invention, a temperature gradient produced by operation of a machine itself, such as a brake or an engine, is used as a basis for monitoring the operation of the machine by comparing the temperature at two locations on the machine with each other or with standard data. Thus, for example, in the case of a vehicle braking system, significant temperature differences between the brakes on opposite sides of the vehicle on the front or rear axles (or even between brakes on the same side provided they are constructed and arranged to carry out the same duties) are likely to be indicative of a fault. Likewise, in the case of an engine block, significant differences in temperature between adjacent and similar portions of the engine block may be indicative of operational faults as between one cylinder and the next. Other applications of the invention include use as means for locating radiator blockages, locating seal leakages, monitoring the operation of air conditioning systems, comparing tire pressures, and monitoring catalyst operation.

In the method and apparatus of the invention, the thermal sensing step may be carried out in sequence and the data obtained from the first of these stored prior to the step of comparison. Moreover, the data processing system may be adapted to compensate the temperature data obtained in the sensing steps in accordance with the periods of time, in each case, for the heat generated at the relevant locations such as the braking friction surfaces, to be conducted to the respective zones of the brake as sensed by the sensor. In this way there is provided convenience in the carrying out of the testing steps together with enhanced accuracy by way of elimination of or reduction of the effects of thermal conduction over potentially significant time periods. It is also envisaged that in certain cases it may be convenient to carry out the second or subsequent test after carrying out a second brake application if arrangements can be made for the first brake application not to interfere with the results obtained in the second application. In such circumstances, it would usually be necessary for the second application to be of an identical duration, and otherwise equal to the first application.

Alternatively, the temperature sensing steps may be carried out simultaneously, or substantially so, by means of the provision of two or more sets of temperature sensing apparatus, at the relevant locations.

In a principal embodiment of the invention, the use of infra-red sensors to determine surface temperature of the machine being analysed is applied using the technique of infrared thermometry wherein infra-red radiation from the surface is detected, and the received electro magnetic signals are electronically conditioned and compared. The detection of the radiation is limited to defined spots or locations on the product, and the temperatures at specific spots or locations are compared with each other or with standard data.

In accordance with general features of the present invention, there is provided a method and apparatus applicable to machine diagnosis or performance analysis wherein temperature measurement using thermographic techniques is used as a basis for fault diagnosis. For this purpose, infra-red electro magnetic radiation may be detected as a basis for indicating temperature. Alternatively, temperatures may be sensed by use of thermocouples, platinum resistance thermometers, or other known temperature measurement or indication technique. Broadly, the invention proposes the use of a comparison of temperature readings as basis for a diagnostic or performance analysis technique.

Where electro magnetic radiation is sensed or detected as a basis for temperature measurement in accordance with the invention, positional guide or indication means or radiation focusing or control means is preferably provided to ensure that the radiation sensed emanates from the required zone on the product. Such position indication means may be in the form of visual guide means such as laser or incandescent vapour discharge pointer means.

The data may be digitized. Microprocessing and other data processing techniques may be applied to edit, display and record the information.

In a significant embodiment of the invention, the method and apparatus is arranged to effect a comparison between the sensed thermometric data and a corresponding predetermined standard in order to establish compliance or otherwise between the two. In this way, by means of a relatively minor modification of the data comparison step, a degree of automatic generation of compliance data can be readily achieved.

Embodiments of the invention will now be described by way of example with reference to the accompanying drawings in which.

DESCRIPTION OF THE PREFERRED EMBODIMENTS

Figure 2:
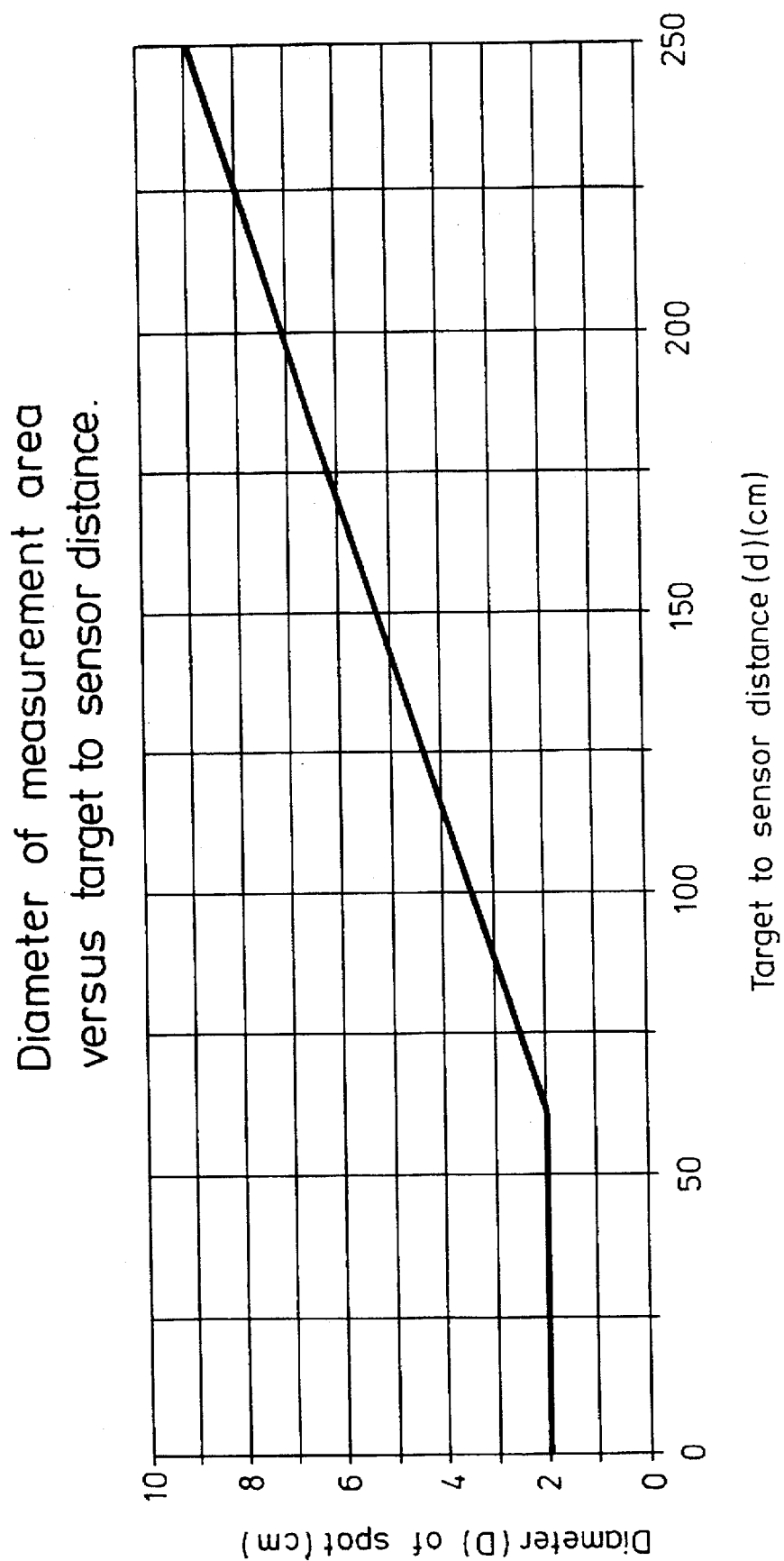
FIG. 2 shows a plot of target to sensor distance in centimeters against diameter of spot (size of area from which radiation is sensed)
Figure 3:
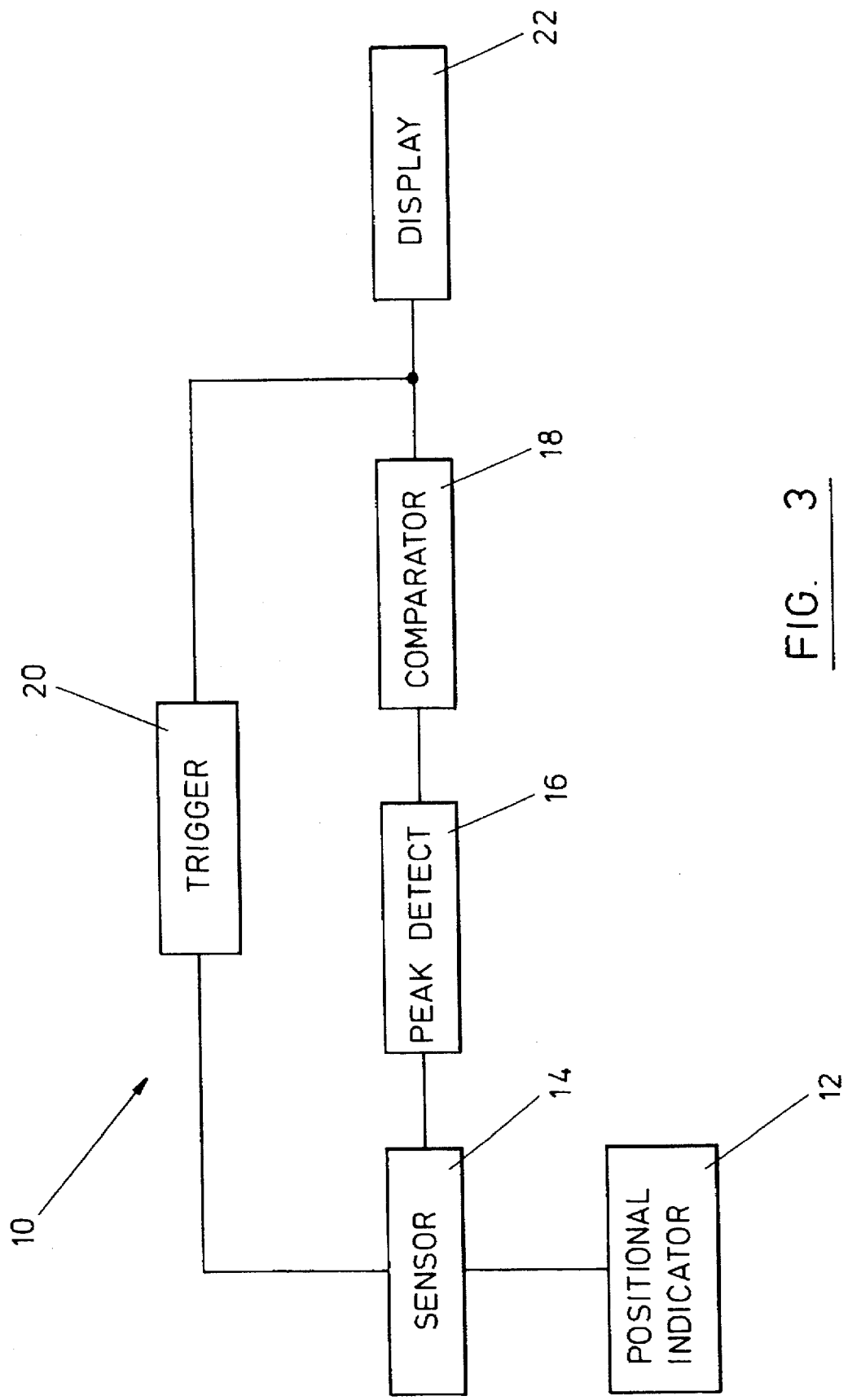
FIGS. 3 and 4 show in block diagram form two embodiments of the invention utilising infra-red radiation as discussed in relation to FIG. 1 and target-to-sensor distances as discussed in relation to FIG. 2.

In a first embodiment of the invention as shown in the block diagram of FIG. 3, there is provided machine diagnosis apparatus 10 comprising a positional indicator 12 in the form of a laser pointer, a sensor 14, peak detect means 16, a comparator 18, trigger means 20 and a display 22. The function of these main parts of apparatus 10 will be described in turn. We consider first the generalities of infra-red emission and the distance of the sensor from the emitter, by reference to FIGS. 1 and 2.

The sensor 14 of FIG. 3 is adapted to sense infra-red radiation emitted from a defined spot or zone location by the machine under test, for example selected brakes, in turn, of a vehicle braking system.

The positional indicator 12 operates to indicate and control the zone from which the apparatus 10 receives radiation and to enable convenient initiation of temperature sampling by use of trigger means (not shown) to commence temperature data processing. With reference to the size of the defined zone from which radiation is received, that zone is determined by a monotonic relationship, in the linear case for example:

$D = D_0 + ad$ where D is diameter of the defined region $D_0$ is minimum diameter of the defined region d is target to sensor distance a is a constant determined from the geometrical properties of the system.

In accordance with the above equation, the main operating parameters of the sensor are design-determined and set, including distance from the object sensed and the adjusted setting of the means for varying the area from which radiation is received, (to determine D).

The positional indicator 12 is operatively connected to the sensor 14 to enable visual verification of the zone sensed in terms of its position.

The form of positional indicator 12 may vary according to requirements. It has been found convenient to employ a laser pointer or an incandescent vapor discharge pointer of the kinds which are available as off-the-shelf devices. However, other optical or even mechanical devices may be utilised to provide a simple positional relationship between the infra-red sensor 14 and the spot or zone from which it receives I/R energy. The significance of ability to direct the sensor 14 accurately can be appreciated from the fact that in these embodiments it is frequently necessary to direct the sensor 14 at a single wheel-mounting nut and stud assembly. The same need for accuracy of positional alignment arises where it is necessary to obtain temperature samples by use of inspection pit facilities below the level of the vehicle's wheels and chassis. The need to gain access may involve a time delay requiring the application of temperature compensation factors in the thermal comparison step or a repetition of the brake test on the second wheel or axle under conditions identical to the first test.

There is shown in FIG. 2 the relationship between the diameter (D) of the measurement area and the sensor to object diameter (d). As shown, the size of the zone sensed is unaffected by sensor distance up to approximately 60 centimeters and then increases linearly, as shown.

Figure 1:
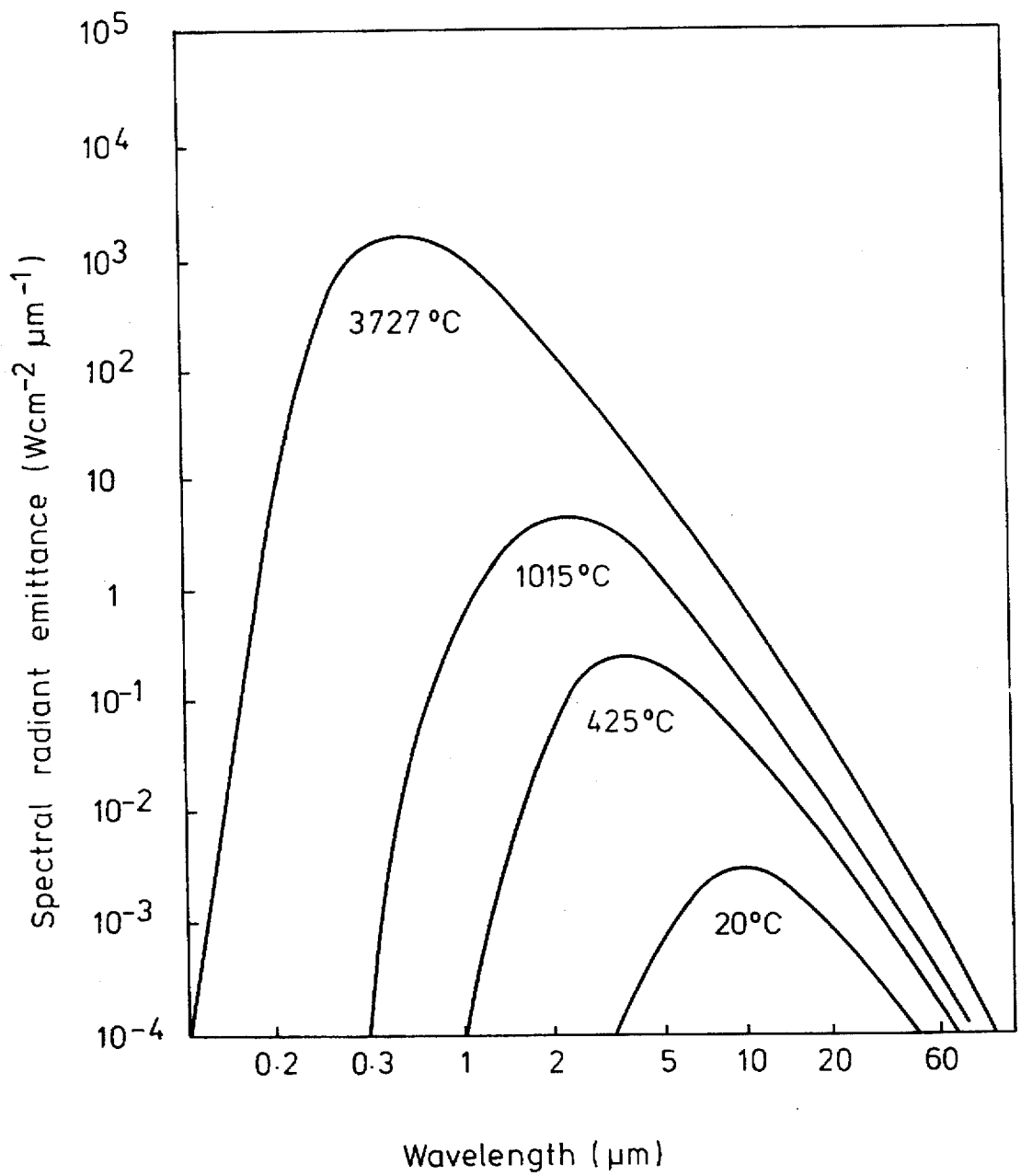
FIG. 1 shows a plot of emission wavelength against emittance for surfaces at the indicated temperatures of 20 degrees Celsius and 425 degrees Celsius and 1015 degrees Celsius and 3727 degrees Celsius.

The sensor 14 is sensitive to wavelengths between 1 and 14 microns, the exact range of wavelength being determined by the proposed operating environment and function of the device. An indium/antimony sensor, for example, has a peak detectivity at 5.5 microns and responds to a temperature range of 27 to 1000 degrees celsius. FIG. 1 shows a typical black body spectrum output for a body at the four temperatures indicated. The apparatus 10 includes means for adapting the indicated temperature in accordance with emissivity value of the object under scrutiny, using an emissivity value of from 0.00 to 1.00.

In the apparatus 10 of FIG. 3 the infra-red sensor 14 is driven by a voltage supply to produce an analogue voltage signal. This signal is fed to the peak detect circuit 16 which functions to ensure that the maximum signal is indicated. Comparator 18 compares the signal to the previous signal and displays a selected option of the resulting data, namely the difference, or both of the final signals.

Display 22 is activated by trigger 20 which causes sensor 14 to stop reading. Positional indicator 12 (which operates optically or mechanically or electronically) is employed to ensure that sensor 14 is directed onto the required zone of the machine under test. Signal processing, which has been functionally described above, is performed using analogue or digital data.

Sensor 14 incorporates an emissivity adjustment capability to take account of differences in the emissivity of materials from which temperatures are to be sampled. Thus, for example, whereas oxidised steel has an emissivity of 0.80 units, and a thick oil film has an emissivity of 0.83 units, metallic paint has an emissivity of 0.52 units and chrome a value of 0.08 units. Appropriate adjustment to offset emissivity variation factors is needed in order to avoid inappropriate readings. However, in most practical cases the material from which the I/R emission is sampled will be the same for each of a pair of readings, whereby no adjustment is needed because the absolute value of the temperature sampled is of less significance than its relative magnitude as between the two readings.

Figure 4:
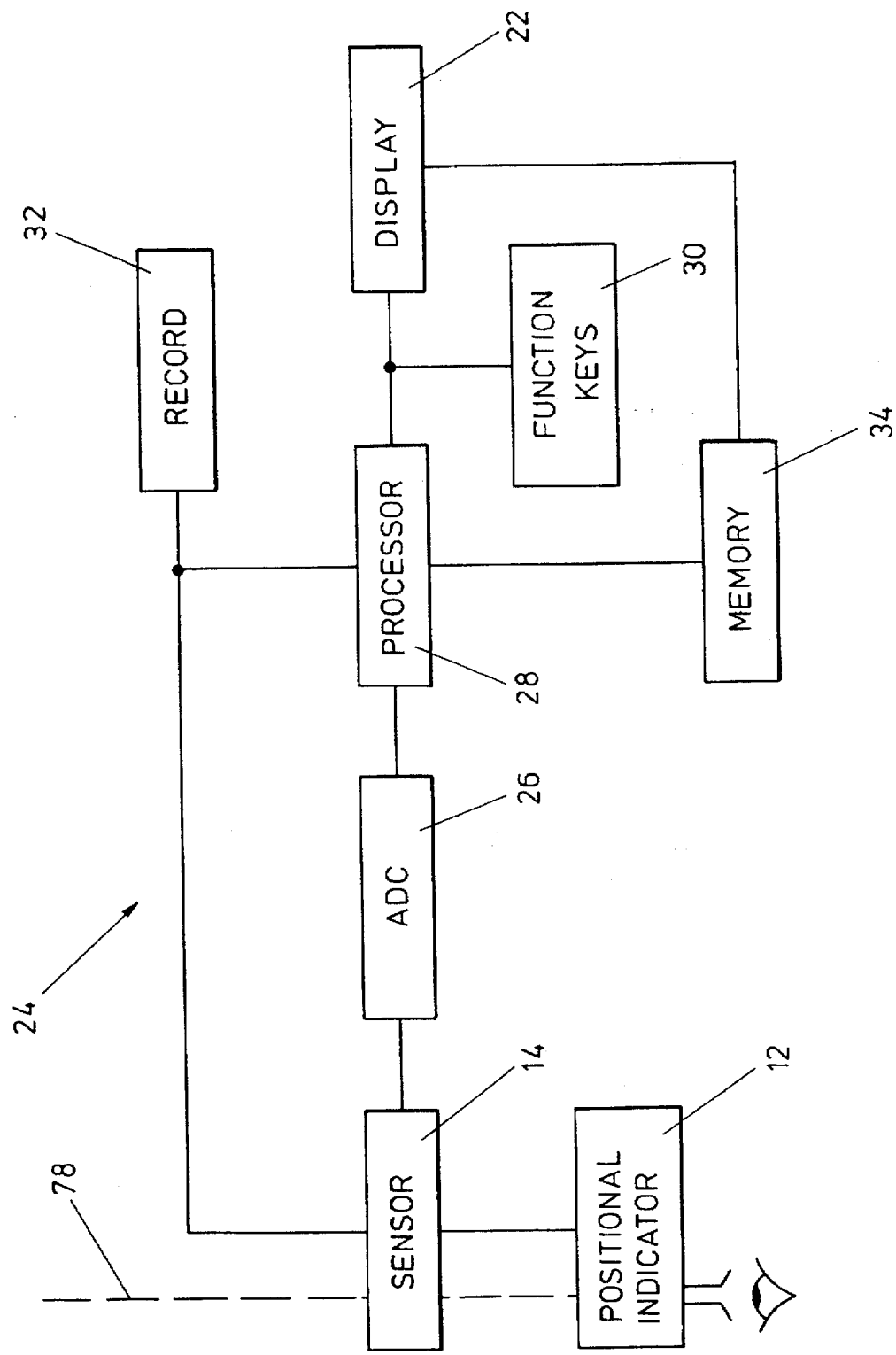

In the apparatus 24 of FIG. 4, the apparatus 10 of FIG. 3 is adapted for processing of the data in digital form using an analogue-to-digital convertor 26 (indicated as ADC) which feeds digital data to a processor 28 which is controlled by function keys 30 and is also connected to a recording system 32 and a memory function 34.

Among the advantages of the embodiment of FIG. 4 is its ability to add processor functions to the output of the apparatus including, for example, data and time indications, vehicle identification numbers, long time memory recall and integration with pre-stored information.

Data derived from the apparatus of FIGS. 3 and 4 is utilised as follows.

When a vehicle undergoes a reduction in speed due to braking, the kinetic energy of the vehicle is converted to heat energy from friction between the brake pads and the surface with which they come into contact, normally a disc or drum. There is therefore a rise in temperature of the disc or drum material, and possibly also of the associated wheel and other parts in the vicinity of the brake.

In accordance with the principles of the invention, infrared sensing of selected spots or zones in the area of the disc or drum is used to measure the temperature of the disc or drum, or of the surrounding area. This temperature data provides an indication of the energy dissipated by the brake, and hence the braking capacity.

The table below gives an example of a vehicle wheel and disc brake assembly in terms of temperatures generated during use. The temperature of the disc is measured, as described previously, by gaining access to the disc by use of inspection pit facilities. Care is taken to ensure that the measurement area is entirely on the disc surface. This is achieved by appropriate alignment of the sensor 14 and control of same by the positional indicator 12.

Several readings are taken around the circumference of the brake discs to obtain an average value. This lessens the effect of local hot-spots caused by uneven geometry of the braking elements. Readings are taken from the right and left hand side discs of each axle, to determine the degree of imbalance.

Mathematical expressions of the imbalance determination are as follows:

SIDE-TO-SIDE BRAKE IMBALANCE $$I_{SS} = \frac{T_{ph} - T_{pl}}{T_{ph}} \times 100\%$$

where $I_{ss}$=side-to-side imbalance
$T_{ph}$=peak temperature (wheel with higher reading)
$T_{pl}$=peak temperature (wheel with lower reading)

AXLE-TO-AXLE BRAKE IMBALANCE

The mathematical expression of the imbalance corresponds to that for side-to-side imbalance with substitution of temperature readings for wheels/axles on the same side of the vehicle as opposed to opposite sides.

Typical data from a four wheel passenger vehicle with a braking imbalance is shown in the following table:

|  | Left disc temperature (°C.) | Right disc temperature (°C.) |
| --- | --- | --- |
| Front axle | 35 | 45 |
| Rear axle | 23 | 22 |

As can be seen from the above table, the right hand disc on the front axle is working harder than that of the left hand disc, and both discs on the front axle are working harder than those on the rear. From these results it can be deduced that attention to the front axle braking system is required.

In this embodiment, the sensing of the disc temperatures at opposite sides of the axles and on the front and rear axles enables a comparison of the temperature data to identify and diagnose remedial action required, in accordance with the principles of the invention.

Additional applications of the invention are shown in the following table.

| FUNCTION | RANGE |
| --- | --- |
| Engine tuning, by examination of exhaust pipes close to manifold. | Ambient–800° C. |
| Location of radiator blockage. | Ambient–150° C. |
| Location of leakage of seals between | Ambient–30° C. |

-continued

| FUNCTION | RANGE |
| --- | --- |
| passenger compartment and atmosphere. Air conditioning system monitoring. | 0–100° C. |
| Measurement of differential tire pressure. | Ambient–50° C. |
| Catalyst monitoring. | Ambient–800° C. |

In the above embodiments, an Agema TPT 50 infra-red spot thermometer was employed as the sensor 14, being sensitive to radiation in the wave band 8 to 14 microns, and including an RS 232 interface (communication protocol) to allow transfer of data from the sensor to the data processing apparatus, including a personal computer, for analysis purposes.

In order to compensate the measured temperature values for variation during a prolonged test period, a compensation equation is applied utilising an exponential calculated from Newtons' law of cooling, applied to the relevant machine surface.

In the braking embodiments, the passenger vehicle tests were performed on a SUN VIC 4000 roller tester using passenger vehicles with both disc and drum brakes. In the tests, a constant braking force was applied for a known period of time and then the surface disc temperature was subsequently measured using the infra-red sensor, the maximum temperature being sensed being then used to provide a basis for the imbalance calculation. The goods vehicle tests were carried out on an HGV roller test facility of the kind used to test for compliance with legislative requirements.

The sequence of operations applied in the test procedure included:

1 Divide the maximum braking force into bands at 50 kg force separation;
2 Start at lowest braking force and maintain braking for 15 seconds;
3 Allow 90 seconds for temperature measurement and to allow the temperatures in the brakes to stabilise;
4 Repeat brake operation for four successive periods at the same braking load;
5 Repeat above sequence of steps at successively increasing braking efforts;
6 Allow brake to cool and measure brake temperature during cooling.

In the case of heavy goods vehicles or trucks, a similar sequence of operations may be used. Where a vehicle does not have disc brakes, there is no available visual access to a braking surface, but only to the outer surface of a brake drum. Therefore, the thermal measurements rely upon the transfer of heat from the drums outwardly. Provided the thermal measurements are made at similar locations on the separate vehicle axles, most factors will be common to both measurements, but care is needed with respect to compensation for the time interval since the braking operation.

In the embodiments, the sensor 14 was provided with a clear view of the target sensed area on the brake. The sensor-to-target distance lay in the range 50 to 100 cm and the sensed zone on the brake was between 2 and 3 cm in diameter.

A peak algorithm was employed in the sensing system to record only the highest temperature reached during each measurement. The angle between the central axis of the sensor 14 and the target was as close to the perpendicular as possible so as to reduce the effect of reflected radiation from other hot sources.

In the embodiments, brake disc temperature was measured directly after braking and from several different points.

Where it is desired to monitor wheel nut/stud temperature (meaning the assembly of a wheel-mounting nut and its associated stud) then the thermal changes occur relatively slowly as compared with the adjacent brake disc due to conductivity factors. Where it is desired to monitor nut/stud temperature, the nut temperature should be monitored at intervals for sufficient time until it has reached its maximum value. Existing tests on passenger and heavy goods vehicle wheels show that this could take between 400 and 1000 seconds to occur.

In order to correct for cooling effects and conductivity effects which are time-related, in order to ensure that sequential measurements are properly related to each other, a minimum of two measurements at the same location should be taken at known time intervals in order to assess the relevant compensation factors.

Test results in the embodiments showed that temperature imbalance correlated well with mechanical brake imbalance.

Figure 5:
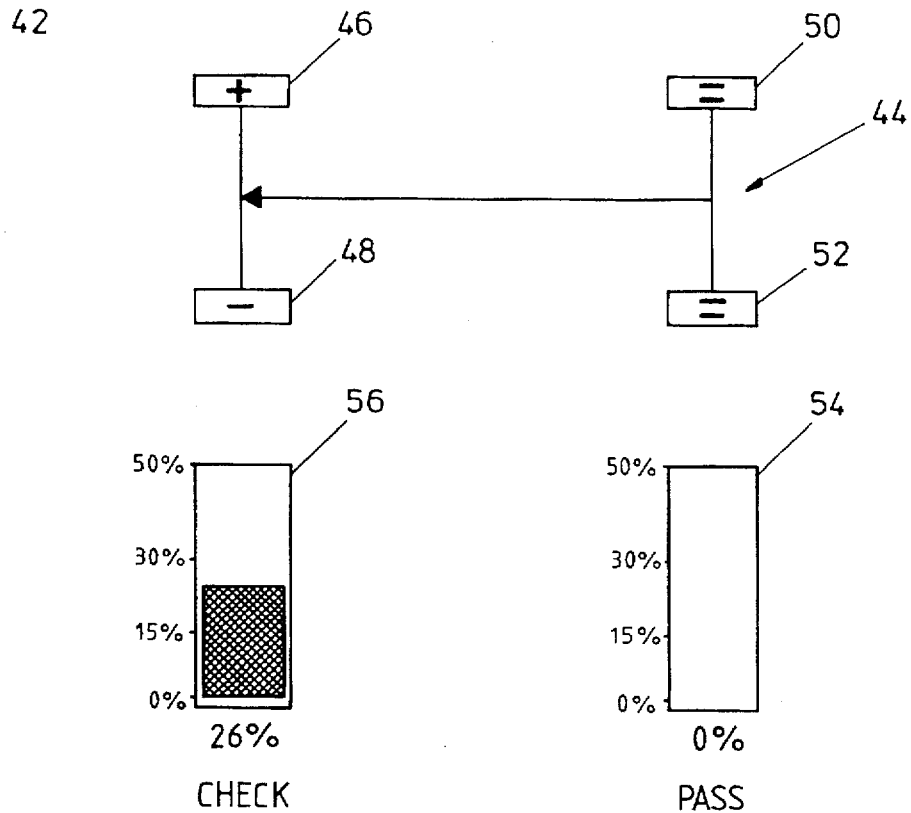
FIG. 5 show s a sample test result sheet obtained using the method of the invention and including vehicle identification data, vehicle wheel layout data, and in alignment with the axles of the vehicle, thermographic data relating to the test results and thus relating to the degree of balance of the brakes.

FIG. 5 shows a typical test result obtainable with the apparatus of the invention.

Thus, brake test report sheet 40 sets out vehicle identification data at 42 and a vehicle wheel configuration diagram is provided at 44 with indications provided on the wheels of the test results in terms of the comparability of braking effort provided by the respective brake assemblies of the wheels.

Thus, whereas the vehicle rear wheels 50 and 52 provide braking effort which is substantially balanced, as shown by the balanced diagram 54, which indicates a Zero per cent difference in braking effort, the front wheels 46 and 48 show a 26 per cent braking imbalance in diagram 56, and this is clarified on wheels 46 and 48 by the plus and minus indications provided thereon to indicate which of these provides the higher braking effort.

Generation of test report Sheets in accordance with the layout and functionality of sheet 40 can be readily implemented in software associated with the processor function of the analysis apparatus.

Figure 6:
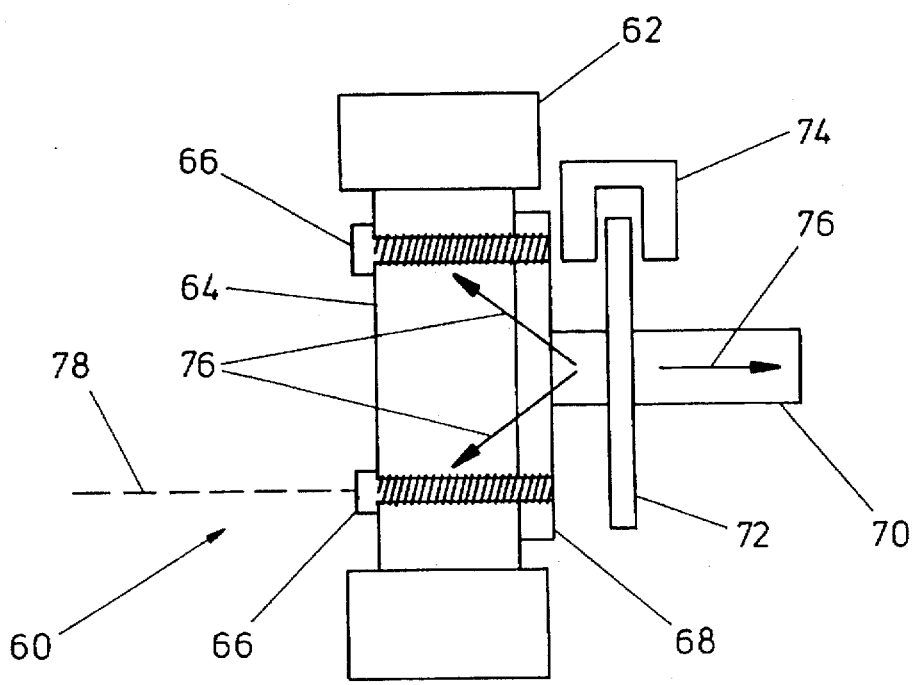
FIG. 6 shows, somewhat diagrammatically, an axial section through a wheel and stub-axle and disc brake assembly of a vehicle.
Figure 7:
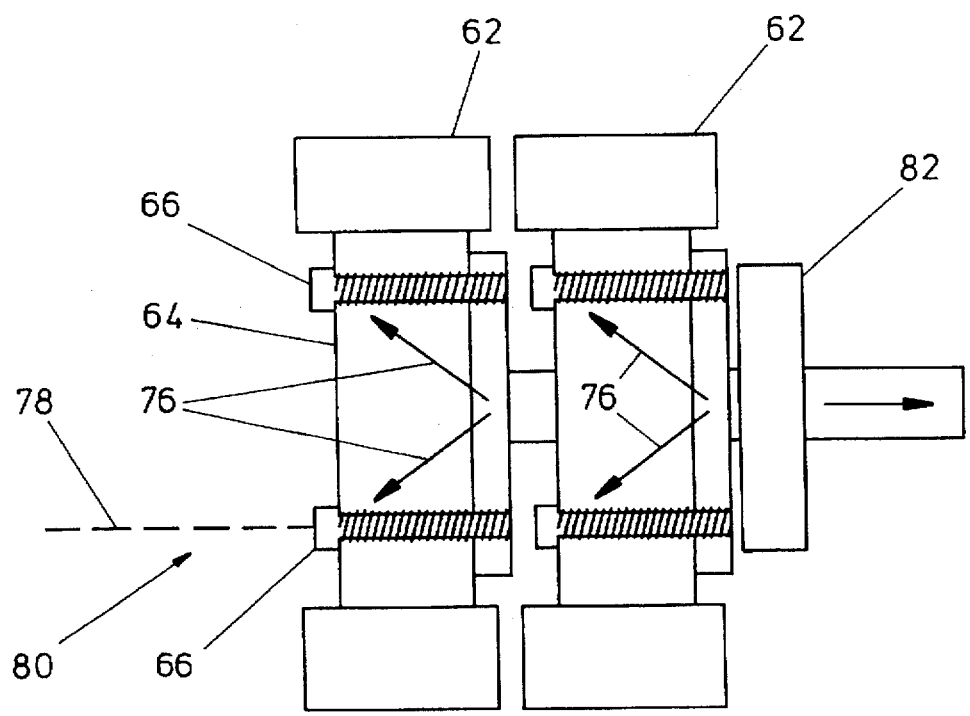
FIG. 7 shows a somewhat diagrammatic axial section through a dual wheel assembly on a stub axle together with an associated drum brake, as used on a goods vehicle.

FIGS. 6 and 7 show somewhat diagrammatic representations of wheel and brake and stub axle assemblies in an automotive vehicle to which the method and apparatus of the invention is applicable.

This in FIG. 6, wheel 60 comprises a tire 62 mounted on a wheel rim and disc assembly 64 secured by threaded studs and nuts, (indicated at 66) to a wheel hub 68 mounted on a stub shaft 70 carrying a brake disc 72, and journalled on the vehicle in the usual way. Brake disc 72 has the usual caliper 74 with associated brake pads (not shown).

In use, heat generated at the friction interface between caliper 74/its pads and brake disc 72 is conducted axially and radially outwards in the directions indicated at arrows 76. This heat causes studs/nuts 66 to be raised in temperature more rapidly than the main body 64 of the wheel 60, whereby temperature readings made by alignment of sensor 14 (see FIG. 4) with the aid of positional indicator 12, enable a relatively rapid measure to be obtained of the thermal effect of the braking operation. In FIGS. 4 and 6 a broken line indication is provided at 78 of the alignment of sensor 14 with nut/stud assemblies 66.

Likewise in FIG. 7, a dual wheel assembly 80 is shown, of the kind employed in trucks or heavy goods vehicles. Parts corresponding to those discussed above in relation to FIG. 6 are numbered as in FIG. 6, for simplicity, and likewise the heat-flow indications 76. In this embodiment, stub axle 70 is of course longer and, as is usual in heavy goods vehicles, a brake drum 82 is provided with the usual internal shoes. However, the generation of heat corresponds to that of disc 72 and caliper 74, though in this case the heat is generated internally of drum 82 at the friction interface between its inner radial-facing surface and the corresponding faces of the shoes. This heat is nevertheless likewise conducted outwards as indicated at 76 and temperature readings can be taken from nut/stud assemblies 66.

Figure 8:
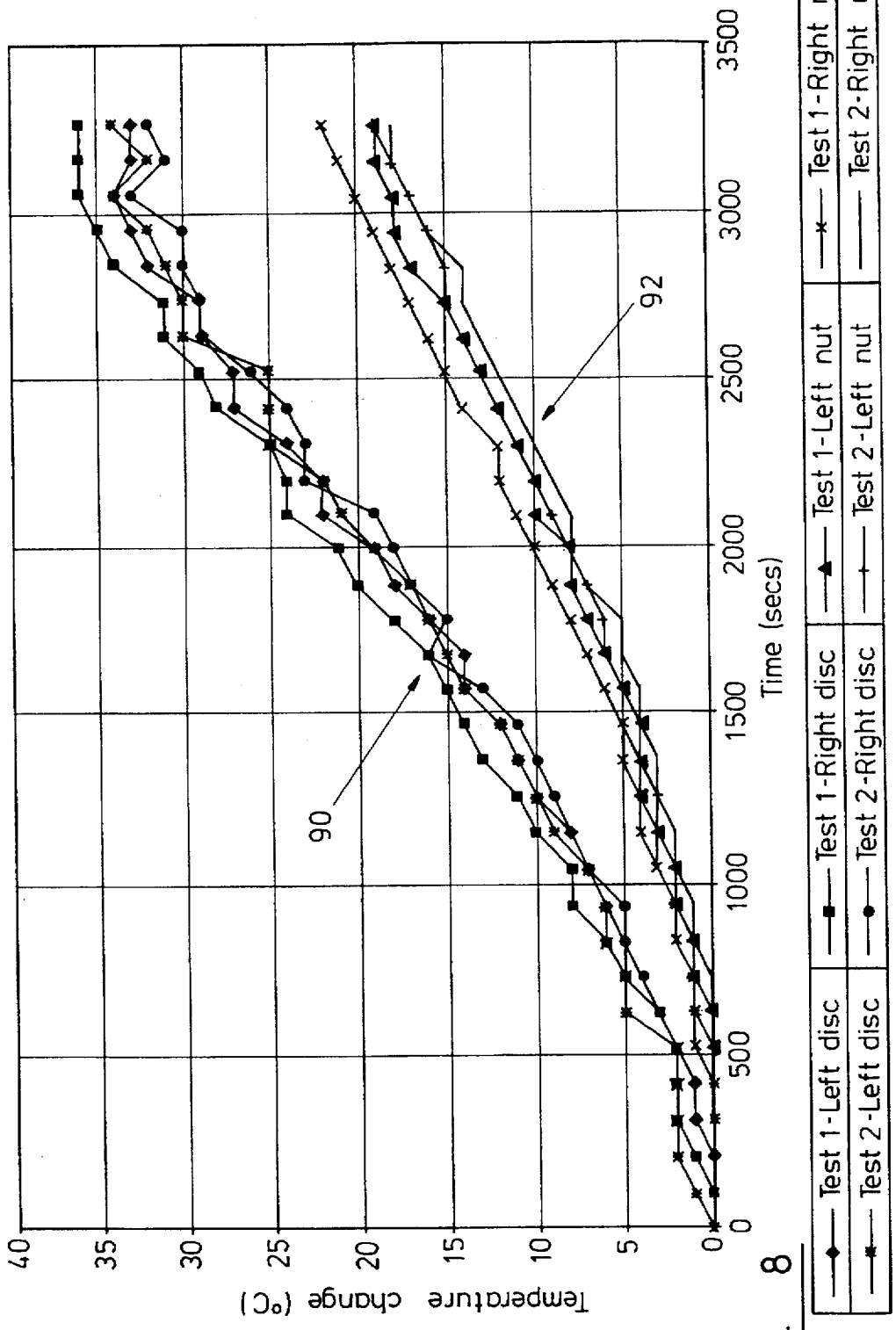
FIG. 8 shows a plot of temperature change against time comparing results obtained in an assembly of the kind shown in FIG. 6 by sensing the temperature on the brake disc and the temperature on the wheel nuts.

FIG. 8 shows the degree of correlation between temperature readings obtained directly from a brake disc corresponding to disc 72 in FIG. 6 and from wheel nut temperatures sensed at nut/stud assembly 66 on the same wheel assembly.

The disc temperatures are indicated by the group of four plots indicated generally at 90, and the corresponding group of four plots obtained from the nuts 66 are indicated at 92. The degree of correlation between these tests is immediately apparent. There is some divergence of the results with increasing time, but the time intervals involved are sufficiently long for this not to raise serious difficulties. As mentioned above, the absolute values of the temperatures are of less significance than their relative magnitudes. The plots shown in FIG. 8 indicate that wheel nut temperatures sensed provide a good indication of corresponding brake disc temperatures.

Figure 9:
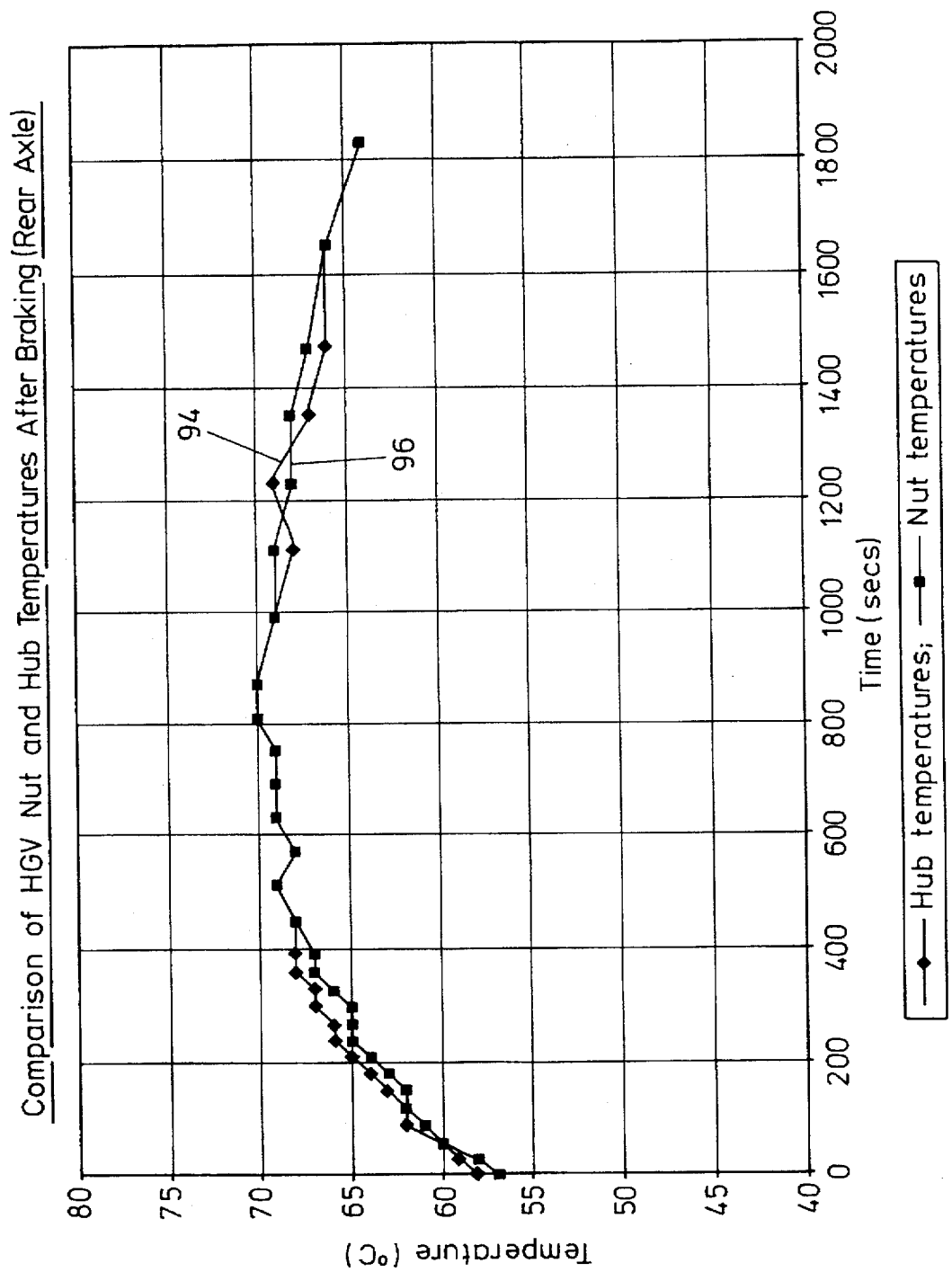
FIG. 9 shows a corresponding plot of temperature against time for hub temperatures and wheel nut temperatures in a wheel assembly of the kind shown in FIG. 7.

Likewise, in FIG. 9, there is shown a comparison of wheel nut and hub temperatures in an assembly of the kind shown in FIG. 7. The nut temperatures are sensed at 66 and the wheel hub temperatures are sensed at a suitable location on the main body of the wheel assembly 64.

As clearly seen in FIG. 9, there is a considerable degree of correlation between the results obtained for the wheel nuts and for the hub temperatures, these later being directly linked to the actual brake temperature by a relatively short conducting path. In FIG. 9, the plots of hub temperatures and nut temperatures are, respectively, identified at 94 and 96.

We claim:

1. A method for analysis of the performance of a machine comprising the steps of:

remotely sensing temperature at a defined spot or zone location on a first portion of the machine after the machine has effected a machine operation;

then repeating the remote sensing step in relation to a second portion of the machine spaced from the first portion; and comparing data from the temperature sensing steps to determine the degree of thermal imbalance between the first and second portions of the machine as a basis for operational diagnosis of the machine.

2. The method of claim 1, and further comprising the step of comparing the data from the temperature sensing steps with known thermal data relating to the machine.

3. The method of claim 1, wherein the sensing steps are carried out using an infra-red spot sensing technique.

4. The method of claim 1, and further comprising the step of positionally guiding the remote sensing step for proper alignment with the defined spot or zone location.

5. The method of claim 1, wherein the machine is an automotive vehicle having wheels and associated brake structures, mounted on axles, the remote sensing steps being carried out respectively on brake structures, or associated structures thermally coupled thereto, at first and second wheels or axles of the vehicle after the brake structures have effected braking operations, the comparing step being effected to determine the degree of braking imbalance between the brake structures of the first and second wheels or axles.

6. The method of claim 5, and further comprising the step of detecting a peak temperature sensed within the defined spot or zone location, and holding this peak value for comparison purposes.

7. The method of claim 5, wherein the step of comparing data from the temperature sensing steps includes comparing the data with a predetermined standard and indicating compliance or lack of compliance of the data with the standard.

8. The method of claim 5, and further comprising the step of storing the data from at least the first of the sensing steps before carrying out the step of comparing the data from the temperature sensing steps.

9. The method of claim 8, and further comprising the step of compensating the temperature data obtained by the sensing steps in accordance with measured periods of time required for the heat generated by the brake structures to be conducted to the respective spot or zone locations of the brake structures or associated thermally coupled structures, the temperatures of which are sensed.

10. Apparatus for analysis of brake structure performance in vehicles having plural wheels and axles, comprising:

a single infra-red spot sensor to sense remotely the temperature of a defined spot or zone location on each of first and second brake structures or associated structures thermally coupled thereto after the brake structures have effected braking operations; and analysis means coupled to said sensor to analyze the data from said sensor to determine the degree of braking imbalance between said first and second brake structures.

11. The apparatus of claim 10 and further comprising positional guide means to enable said sensor to be properly aligned with said defined spot or zone location.

12. The apparatus of claim 11, wherein said positional guide means includes laser pointer means.

13. The apparatus of claim 10, wherein said analysis means includes peak temperature detect-and-hold means to detect and hold the peak temperature sensed within each said defined spot or zone location for comparison purposes.

14. The apparatus of claim 10, wherein said analysis means includes means to compare said data from said infra-red sensor with a predetermined standard and to determine compliance or lack of compliance of the sensed data with said standard.

15. The apparatus of claim 10, and further comprising recording means to store the temperature data from the brake structure of a first vehicle wheel or axle before comparing that data with data from brake structure of a second wheel or axle.

16. The apparatus of claim 15, and further comprising compensating means for compensating the temperature data obtained from said infra-red sensor in accordance with the period of time for the heat generated by a brake structure to be conducted to the spot or zone location sensed by said sensor.

17. Apparatus for analysis of the performance of a machine comprising:

a single thermal sensor to sense the temperature of each of plural portions of the machine after a machine operation; and analysis means coupled to said sensor to compare the data from plural portions of the machine to determine the degree of thermal imbalance among the portions of the machine as a basis for operational diagnosis of the machine.

18. The apparatus of claim 17, and further comprising storage means for storing known thermal data for the machine, said analysis means being coupled to said storage means and being operative to compare the sensed data with the stored known data of the machine.

* * * * *